US011312183B2

(12) United States Patent
Tanabe et al.

(10) Patent No.: US 11,312,183 B2
(45) Date of Patent: Apr. 26, 2022

(54) PNEUMATIC TYRE

(71) Applicant: Sumitomo Rubber Industries, Ltd., Kobe (JP)

(72) Inventors: Maiko Tanabe, Kobe (JP); Ryuta Kitora, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 330 days.

(21) Appl. No.: 16/414,240

(22) Filed: May 16, 2019

(65) Prior Publication Data

US 2019/0366774 A1 Dec. 5, 2019

(30) Foreign Application Priority Data

May 31, 2018 (JP) .............................. JP2018-105186
Sep. 21, 2018 (JP) .............................. JP2018-177770

(51) Int. Cl.
*B60C 11/12* (2006.01)
*B60C 11/03* (2006.01)
*B60C 11/13* (2006.01)

(52) U.S. Cl.
CPC ...... *B60C 11/0304* (2013.01); *B60C 11/0306* (2013.01); *B60C 11/1204* (2013.01);
(Continued)

(58) Field of Classification Search
CPC ............. B60C 11/0304; B60C 11/1263; B60C 11/1281; B60C 11/0306; B60C 11/04; B60C 11/1236; B60C 11/1389; B60C 11/1204; B60C 2011/0341; B60C 2011/0348; B60C 2011/0309; B60C 2011/1209; B60C 2011/1254; B60C 2011/0388
(Continued)

(56) References Cited

U.S. PATENT DOCUMENTS

D781,774 S * 3/2017 Aoki ............................ D12/517
2018/0086149 A1* 3/2018 Hoshino ............. B60C 11/0306

FOREIGN PATENT DOCUMENTS

EP 2537688 A2 12/2012
EP 2781374 A2 9/2014
(Continued)

OTHER PUBLICATIONS

Machine translation of JP01-036505 (no date).*
Extended European Search Report for European Application No. 19174272.5. dated Sep. 11, 2019.

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A tyre includes a tread portion having an outer shoulder main groove, a crown main groove, and an outer middle land region defined between the outer shoulder main groove and the crown main groove. The outer middle land region is provided with first middle sipes each extending inwardly in a tyre axial direction from the outer shoulder main groove to have an inner end in the outer middle land region and second middle sipes each extending outwardly in the tyre axial direction from the crown main groove to have an outer end in the outer middle land region. The number of the second middle sipes is larger than the number of the first middle sipes.

18 Claims, 12 Drawing Sheets

(52) U.S. Cl.
CPC ...... *B60C 11/1236* (2013.01); *B60C 11/1263* (2013.01); *B60C 11/1384* (2013.01); *B60C 2011/0348* (2013.01); *B60C 2011/0388* (2013.01)

(58) Field of Classification Search
USPC .................................................. D12/505–532
See application file for complete search history.

(56) References Cited

FOREIGN PATENT DOCUMENTS

| | | | | | |
|---|---|---|---|---|---|
| EP | 3153334 | A1 | | 4/2017 | |
| EP | 3254872 | A1 | * | 12/2017 | ........... B60C 11/033 |
| JP | 01036505 | A | * | 2/1989 | ............. B60C 11/04 |
| JP | 2012254654 | A | * | 12/2012 | ............. B60C 11/12 |
| JP | 2016-199118 | A | | 12/2016 | |
| JP | 2016199118 | A | * | 12/2016 | ......... B60C 11/1236 |

\* cited by examiner

PNEUMATIC TYRE

TECHNICAL FIELD

The present invention relates to a tyre having improved steering stability performance, ride comfort performance, noise performance, and fuel economy performance.

BACKGROUND ART

There has been proposed a tyre developed to have the improved noise performance while maintaining the steering stability performance (see Japanese Unexamined Patent Application Publication No. 2016-199118 (Patent Literature 1), for example).

Generally speaking, in order to improve the noise performance and the ride comfort performance of a tyre, it is considered effective to decrease impact received from a road surface by increasing thickness of a tread rubber, or by suppressing rigidity of a belt layer and a band layer arranged on an outer side in a tyre radial direction thereof.

SUMMARY OF THE INVENTION

However, when the thickness of the tread rubber is increased, the weight of the tyre is increased and rolling resistance is also increased, therefore, it is possible that the fuel economy performance is affected. Further, when the rigidity of the belt layer is suppressed, it is possible that the steering stability performance is affected.

Even in the technology disclosed in the Patent Literature 1, it is not easy to achieve the steering stability performance, the ride comfort performance, the noise performance, and the fuel economy performance at the same time at a high level, there still is a demand for further improvement.

The present invention was made in view of the above, and a primary object thereof is to provide a tyre having the steering stability performance, the ride comfort performance, and the noise performance achieved at a high level at the same time without deteriorating the fuel economy performance.

In one aspect of the present invention, a tyre comprises a tread portion comprising a first shoulder main groove extending continuously in a tyre circumferential direction on a side of a first tread ground contact edge positioned on one side of a tyre equator, a second shoulder main groove extending continuously in the tyre circumferential direction on a side of a second tread ground contact edge positioned on the other side of the tyre equator, at least one crown main groove extending continuously in the tyre circumferential direction between the first shoulder main groove and the second shoulder main groove, a first middle land region defined between the first shoulder main groove and the crown main groove, a second middle land region defined between the second shoulder main groove and the crown main groove, a first shoulder land region defined between the first tread ground contact edge and the first shoulder main groove, and a second shoulder land region defined between the second tread ground contact edge and the second shoulder main groove, wherein the first middle land region is provided with first middle sipes each extending inwardly in a tyre axial direction from the first shoulder main groove to have an inner end in the first middle land region, second middle sipes each extending outwardly in the tyre axial direction from the crown main groove to have an outer end in the first middle land region, and the number of the second middle sipes is larger than the number of the first middle sipes.

In another aspect of the invention, it is preferred that the number of the second middle sipes is twice or more the number of the first middle sipes.

In another aspect of the invention, it is preferred that the second middle land region is provided with third middle sipes each extending inwardly in the tyre axial direction from the second shoulder main groove to have an inner end in the second middle land region, and fourth middle sipes each extending outwardly in the tyre axial direction from the crown main groove to have an outer end in the second middle land region, and the number of the fourth middle sipes is equal to the number of the third middle sipes.

In another aspect of the invention, it is preferred that rigidity in the tyre circumferential direction of the first middle land region is greater than rigidity in the tyre circumferential direction of the second middle land region.

In another aspect of the invention, it is preferred that the first shoulder land region is provided with a plurality of first shoulder sipes each connecting between the first tread ground contact edge and the first shoulder main groove, and each of the first shoulder sipes includes a deep sipe extending inwardly in the tyre axial direction from the first tread ground contact edge to have an inner end in the first shoulder land region and a shallow sipe connecting between the inner end of the deep sipe and the first shoulder main groove and having a depth smaller than that of the deep sipe.

In another aspect of the invention, it is preferred that the deep sipe has a curved portion extending in the tyre axial direction in a curved manner, and the shallow sipe has a bent portion extending in the tyre axial direction in a bent manner.

In another aspect of the invention, it is preferred that the first shoulder land region is provided with first shoulder lateral grooves each extending inwardly in the tyre axial direction from the first tread ground contact edge between a respective pair of the first shoulder sipes adjacent to each other in the tyre circumferential direction to have an inner end in the first shoulder land region, and a length in the tyre axial direction of each of the first shoulder lateral grooves is larger than a length in the tyre axial direction of the deep sipe.

In another aspect of the invention, it is preferred that the first shoulder lateral grooves are provided at positions so as not to overlap with the first middle sipes in the tyre circumferential direction.

In another aspect of the invention, it is preferred that a length in the tyre axial direction between the inner end of each of the first shoulder lateral grooves and the first shoulder main groove is in a range of from 10% to 30% of a length in the tyre axial direction of the first shoulder land region.

In another aspect of the invention, it is preferred that a position of the tread portion when mounted on a vehicle is specified such that the first tread ground contact edge is positioned on an outer side of the vehicle.

In another aspect of the invention, it is preferred that a position of the tread portion when mounted on a vehicle is specified such that the first tread ground contact edge is positioned on an outer side of the vehicle, the first middle land region is provided with a first circumferential sipe extending continuously in the tyre circumferential direction, the first shoulder land region is provided with a plurality of first shoulder sipes each extending between the first tread ground contact edge and the first shoulder main groove, at least one of the first shoulder sipes has a bent portion, and the bent portion includes a first bent portion which is bent so as to be convex in a first direction and a second bent portion which is bent so as to be convex in a direction opposite to the first direction.

In another aspect of the invention, it is preferred that the at least one of the first shoulder sipes has a vertical component between the first bent portion and the second bent portion, and the vertical component is arranged at an angle of less than 30 degrees with respect to the tyre circumferential direction.

In another aspect of the invention, it is preferred that the first bent portion and the second bent portion are arranged on an inner side in the tyre axial direction of a center in the tyre axial direction of the first shoulder land region.

In another aspect of the invention, it is preferred that the first shoulder land region is provided with a plurality of first shoulder lateral grooves each extending from the first tread ground contact edge to terminate within the first shoulder land region.

In another aspect of the invention, it is preferred that each of the plurality of the first shoulder lateral grooves is arranged at an angle in a range of from 0 to 10 degrees with respect to the tyre axial direction.

In another aspect of the invention, it is preferred that the second bent portion is arranged on an outer side in the tyre axial direction of the first bent portion, and a distance in the tyre axial direction between the inner end in the tyre axial direction of each of the first shoulder lateral grooves and the second bent portion is smaller than a groove width of the first shoulder main groove.

In another aspect of the invention, it is preferred that each of the first middle sipes is arranged at a position so as to be continuous with a respective one of the first shoulder sipes with the first shoulder main groove therebetween.

In another aspect of the invention, it is preferred that a chamfered portion is formed at a connection portion between each of the first middle sipes and the first shoulder main groove.

In another aspect of the invention, it is preferred that the chamfered portion includes an inclined surface surrounded by one of edges of the first middle land region on a ground contacting surface thereof, one of edges of the first shoulder main groove on groove walls thereof, and one of edges of a respective one of the first middle sipes on sipe walls thereof.

In another aspect of the invention, it is preferred that the tread portion includes a crown land region arranged on the tyre equator, and the crown land region is a plain rib provided with no grooves and no sipes.

DESCRIPTION OF THE PREFERRED EMBODIMENT

An embodiment of the present invention will now be described in detail with accompanying drawings.

Figure 1:
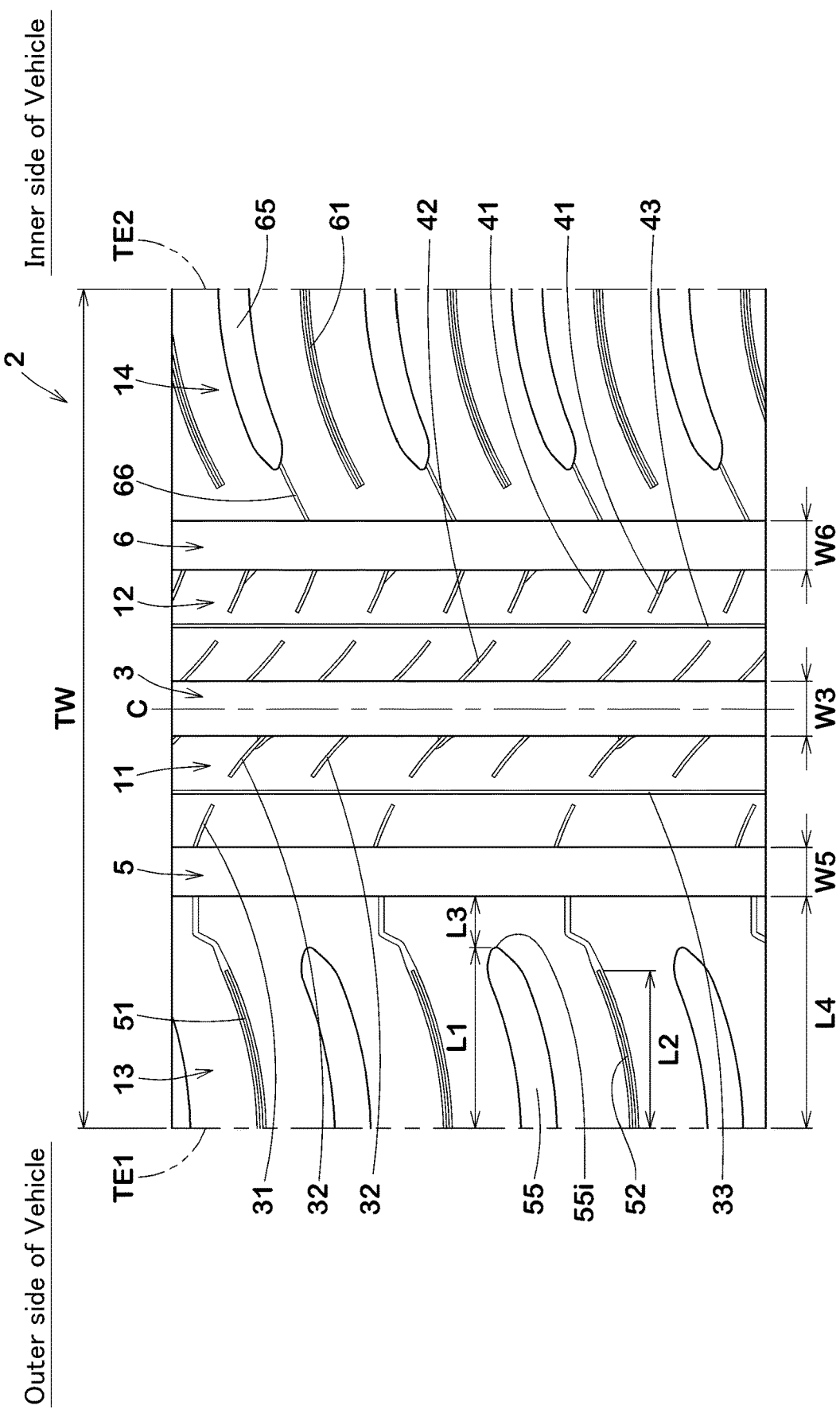
FIG. 1 is a development view of a tread portion of a tyre according to an embodiment of the present invention.

FIG. 1 is a development view of a tread portion 2 of a tyre according to an embodiment of the present invention. As shown in FIG. 1, the tyre in this embodiment is suitably used as a pneumatic tyre for a passenger car, for example, but it is not limited to this.

The tyre in this embodiment is provided with an asymmetric tread pattern whose position when mounted on a vehicle is specified. The mounting position of the tyre on a vehicle is indicated by letters and the like on at least one of sidewall portions (not shown), for example.

The tread portion 2 includes a tread ground contact edge TE1 positioned on one side of a tyre equator (C) and a tread ground contact edge TE2 positioned on the other side of the tyre equator (C).

The tread ground contact edges TE1 and TE2 means outermost tread ground contact edges in a tyre axial direction when the tyre in a standard state is in contact with a flat surface with zero camber angles by being loaded with a standard tyre load. Here, the standard state is a state in which the tyre is mounted on a standard rim (not shown), inflated to a standard tyre inner pressure, and loaded with no tyre load. Hereinafter, dimensions and the like of various parts of the tyre are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard tyre inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tyre is for a passenger car, the standard tyre inner pressure is 180 kPa, for example.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. When the tyre is for a passenger car, the standard tyre load is a load equivalent to 88% of the above loads, for example.

In this embodiment, it is preferred that the tyre is used such that, when the tyre is mounted on a vehicle, the tread ground contact edge TE1 is an outer tread ground contact edge positioned on an outer side of the vehicle. However, the tyre may be used such that when the tyre is mounted on a vehicle, the tread ground contact edge TE1 is an inner tread ground contact edge positioned on an inner side of the vehicle. A case will be described below in which the tread ground contact edge TE1 is the outer tread ground contact edge and the tread ground contact edge TE2 is the inner tread ground contact edge.

The tread portion 2 includes an outer shoulder main groove 5 (first shoulder main groove) extending continuously in a tyre circumferential direction on a side of the outer tread ground contact edge TE1 (first tread ground contact edge), an inner shoulder main groove 6 (second shoulder main groove) extending continuously in the tyre circumferential direction on a side of the inner tread ground contact edge TE2 (second tread ground contact edge), and at least one crown main groove 3 (crown main groove) extending continuously in the tyre circumferential direction between the outer shoulder main groove 5 and the inner shoulder main groove 6. The tread portion 2 in this embodiment includes one crown main groove 3 extending on the tyre equator (C). The outer shoulder main groove 5, the inner shoulder main groove 6, and the crown main groove 3 in this embodiment extend linearly, but they may extend in a zigzag manner.

It is possible that a width w3 of the crown main groove 3, a width w5 of the outer shoulder main groove 5, and a width w6 of the inner shoulder main groove 6 are suitably set according to the custom. In the pneumatic tyre for a passenger car in this embodiment, it is preferred that each of the widths w3, w4, and w5 is in a range of from 4.0% to 8.5% of a tread ground contacting width TW, for example.

The tread ground contacting width TW is a distance in the tyre axial direction between the tread ground contact edges TE1 and TE2 when the tyre in the standard state is in contact with a flat surface with zero camber angles by being loaded with the standard tyre load.

When the width w3, the width w4, or the width w6 is less than 4.0% of the tread ground contacting width TW, it is possible that drainage performance is affected. On the other hand, when the width w3, the width w4, or the width w6 is more than 8.5% of the tread ground contacting width TW, rubber volume of the tread portion 2 is decreased, therefore, it is possible that anti-wear performance is affected.

Figure 2:
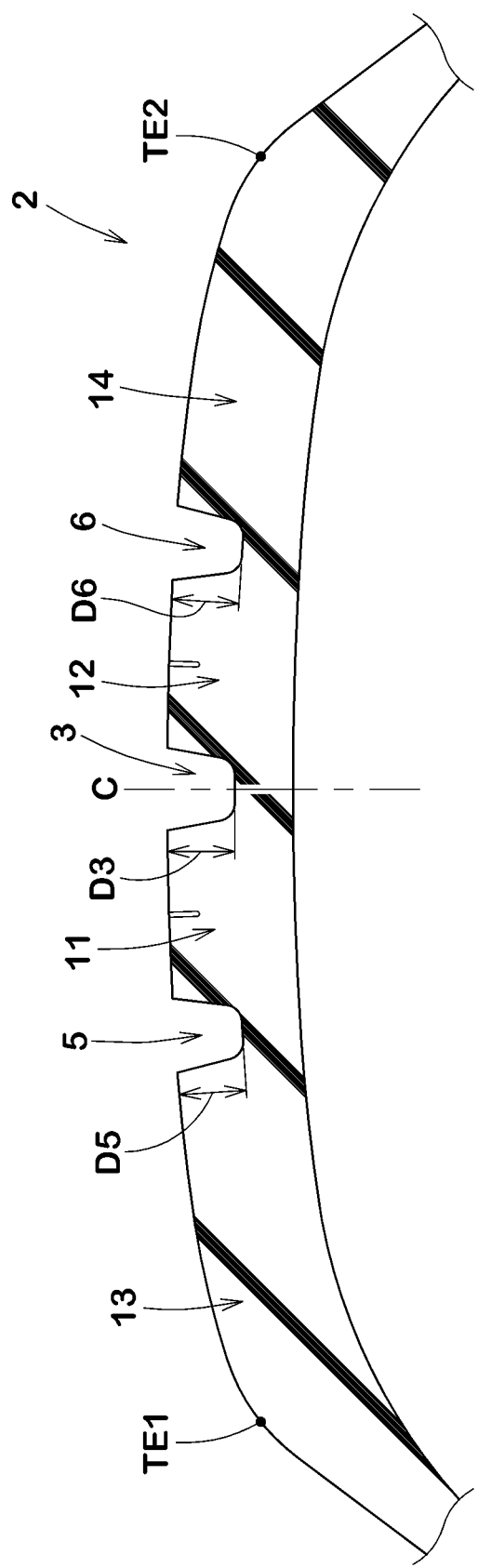
FIG. 2 is a cross-sectional view of the tread portion of FIG. 1.

FIG. 2 is a cross-sectional view of the tread portion 2 of FIG. 1. As shown in FIG. 2, it is possible that a depth D3 of the crown main groove 3 and a depth D5 of the outer shoulder main groove 5 and a depth D6 of the inner shoulder main groove 6 are suitably set according to the custom. In a case of a pneumatic tyre for a passenger car in this embodiment, it is preferred that each of the depths D3, D5, and D6 is in a range of from 5 to 10 mm.

When each of the depths D3, D5, and D6 is less than 5 mm, it is possible that the drainage performance is affected. On the other hand, when any one of the depths D3, D5, and D6 is more than 10 mm, the rigidity of the tread portion 2 is insufficient, therefore, it is possible that the steering stability performance is affected.

The tread portion 2 is provided with an outer middle land region 11 (first middle land region) defined between the crown main groove 3 and the outer shoulder main groove 5. The tread portion 2 is provided with an outer shoulder land region (first shoulder land region) defined between the outer shoulder main groove 5 and the outer tread ground contact edge TE1. The tread portion 2 is provided with an inner middle land region 12 (second middle land region) defined between the crown main groove 3 and the inner shoulder main groove 6. The tread portion 2 is provided with an inner shoulder land region 14 (second shoulder land region) defined between the inner shoulder main groove 6 and the inner tread ground contact edge TE2.

Figure 3:
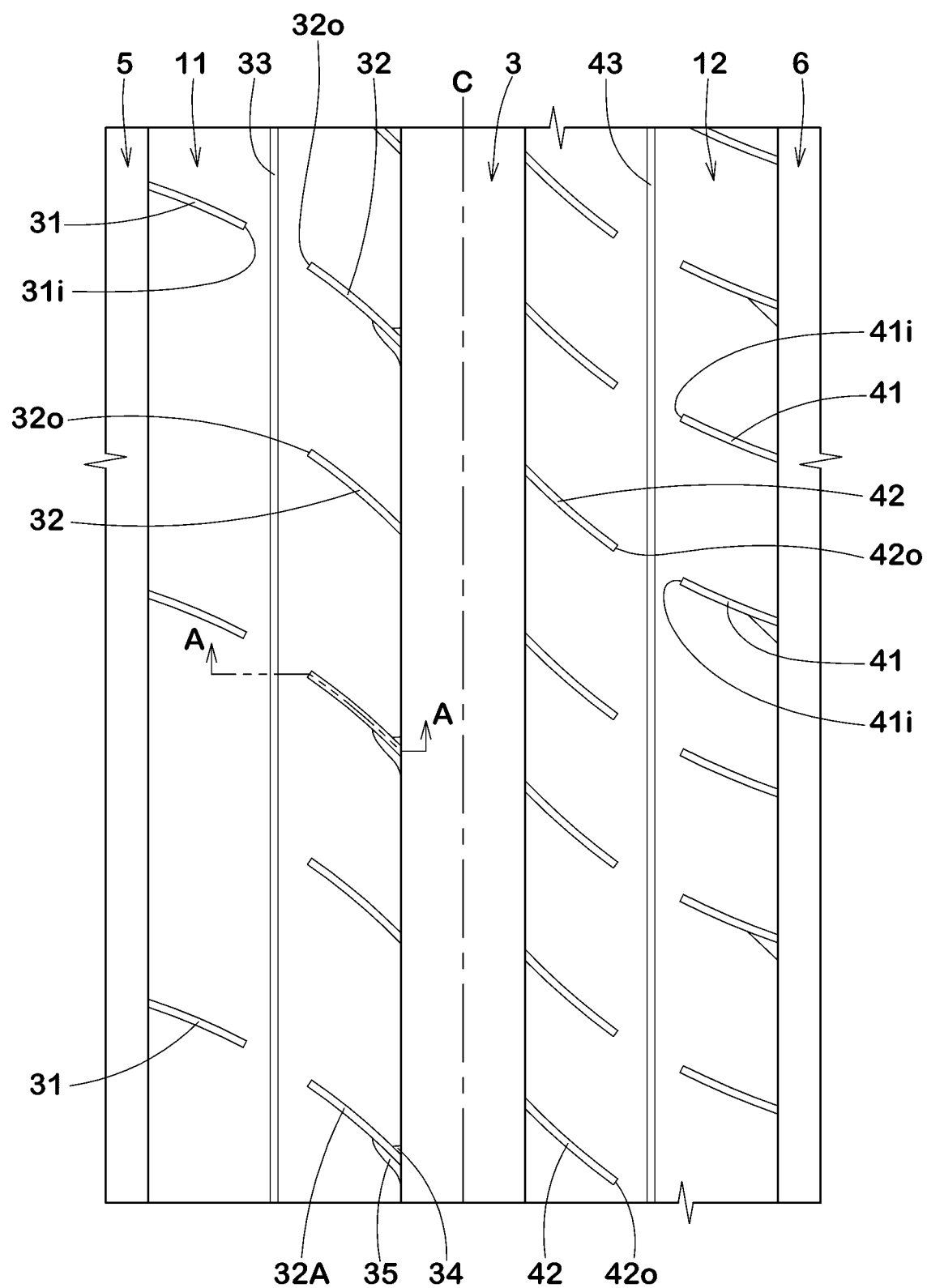
FIG. 3 is an enlarged development view of an outer middle land region and an inner middle land region of FIG. 1.

FIG. 3 shows the outer middle land region 11 and the inner middle land region 12.

The outer middle land region 11 is provided with first middle sipes 31 each extending inwardly in the tyre axial direction from the outer shoulder main groove 5 and second middle sipes 32 each extending outwardly in the tyre axial direction from the crown main groove 3. Thereby, the impact which the outer middle land region 11 receives from a road surface is moderated by the first middle sipes 31 and the second middle sipes 32, therefore, the noise performance and the ride comfort performance of the tyre are improved.

Here, the "sipe" is an incision having a width of 2 mm or less (preferably 1.5 mm or less), and is to be closed under the condition in which the tyre is in contact with the ground by being loaded with the standard tyre load, that is, is to be closed by a high ground contact pressure on a ground contacting surface.

Each of the first middle sipes 31 and the second middle sipes 32 in this embodiment extends in the same direction with respect to the tyre axial direction in a curved manner with substantially the same curvature.

Each of the first middle sipes 31 has an inner end (31$i$) in the outer middle land region 11 and each of the second middle sipes 32 has an outer end (32$o$) in the outer middle land region 11. Thereby, continuity in the tyre circumferential direction of the outer middle land region 11 is maintained, therefore, excellent steering stability performance is obtained by its high rigidity.

Further, the number of the second middle sipes 32 is larger than the number of the first middle sipes 31. That is, in the outer middle land region 11, by a number of the second middle sipes 32 provided in an inner region in the tyre axial direction in which the ground contact pressure tends to be high, the impact received from a road surface is moderated. Thereby, the noise performance and the ride comfort performance of the tyre is improved without setting the thickness of the tread rubber large or suppressing the rigidity of the belt layer. On the other hand, in the outer middle land region 11, in an outer region in which the ground contact pressure during cornering tends to be high when the tyre has a slip angle or when the vehicle rolls, high rigidity is easily ensured by limiting the number of the first middle sipes 31 to be small, therefore, excellent steering stability performance is obtained. By a synergetic effect described above, it is possible that the steering stability performance, the ride comfort performance, and the noise performance are exerted at the same time at a high level without deteriorating the fuel economy performance.

It is preferred that the number of the second middle sipes 32 is twice or more times the number of the first middle sipes 31. In other words, it is preferred that each of pitches of the second middle sipes 32 is half or less times each of pitches of the first middle sipes 31. By the second middle sipes 32 and the first middle sipes 31 configured as such, it is possible that the steering stability performance, the ride comfort performance, the noise performance, and the fuel economy performance are exerted at the same time at a higher level. Further, by the second middle sipes 32 and the first middle sipes 31 described above, a high design effect is obtained, therefore, appearance performance of the tyre is improved.

The outer middle land region 11 may be provided with a first circumferential sipe 33 extending continuously in the tyre circumferential direction. The first circumferential sipe 33 extends between the inner ends (31i) of the first middle sipes 31 and the outer ends (32o) of the second middle sipes 32. The first circumferential sipe 33 in this embodiment extends linearly, but it may be configured to extend in a zigzag manner. It is preferred that the first circumferential sipe 33 is arranged at a position in a range of from 45% to 55% of a length in the tyre axial direction of the outer middle land region 11 from an inner end in the tyre axial direction of the outer middle land region 11. By the first circumferential sipe 33 configured as such, the impact which the outer middle land region 11 receives from a road surface is moderated, therefore, the noise performance and the ride comfort performance of the tyre are improved.

It is preferred that a width of the first circumferential sipe 33 is in a range of from 0.5 to 1.0 mm. The width of the first circumferential sipe 33 is 0.5 mm or more, therefore, the impact which the outer middle land region 11 receives is further moderated. The width of the first circumferential sipe 33 is 1.0 mm or less, therefore, the rigidity in the tyre axial direction of the outer middle land region 11 is easily ensured, thereby, the steering stability performance is improved.

The second middle sipes 32 include second middle sipes 32A each smoothly continuous from corresponding one of the first middle sipes 31 with the first circumferential sipe 33 therebetween. The expression "smoothly continuous" at least means that the corresponding one of the first middle sipes 31 and the each of the second middle sipes 32A are inclined in the same direction with respect to the tyre axial direction and an imaginary line obtained by extending the corresponding one of the first middle sipes 31 inwardly in the tyre axial direction and an imaginary line obtained by extending the each of the second middle sipes 32A outwardly in the tyre axial direction overlap with each other or slightly displaced from each other in the tyre circumferential direction in the first circumferential sipe 33. It is preferred that a displacement amount described above in the tyre circumferential direction is 2 mm or less, for example. By the first middle sipes 31 and the second middle sipes 32A having a positional relationship with each other, the outer middle land region 11 has the continuity in rigidity distribution thereof, therefore, the impact which the outer middle land region 11 receives from a road surface is mildly moderated, thereby, the ride comfort performance is improved.

A chamfered portion 34 and a chamfered portion 35 are provided in an opening portion of each of the second middle sipes 32A which is connected with the crown main groove 3. By the chamfered portions 34 and 35, the impact which the outer middle land region 11 receives from a road surface is moderated, therefore, the noise performance and the ride comfort performance of the tyre are improved.

Each of the chamfered portions 34 is provided in a corner portion where respective one of the second middle sipes 32A intersects with the crown main groove 3 at an acute angle, and each of the chamfered portions 35 is provided in a corner portion where a respective one of the second middle sipes 32A intersects with the crown main groove 3 at an obtuse angle. The volume removed from the outer middle land region 11 by the chamfered portions 35 (the volume of the chamfered portions 35) is larger than the volume removed from the outer middle land region 11 by the chamfered portions 34. Thereby, at the corner portions where the chamfered portions 35 are provided, the impact which the outer middle land region 11 receives from a road surface is further moderated.

Figure 4:
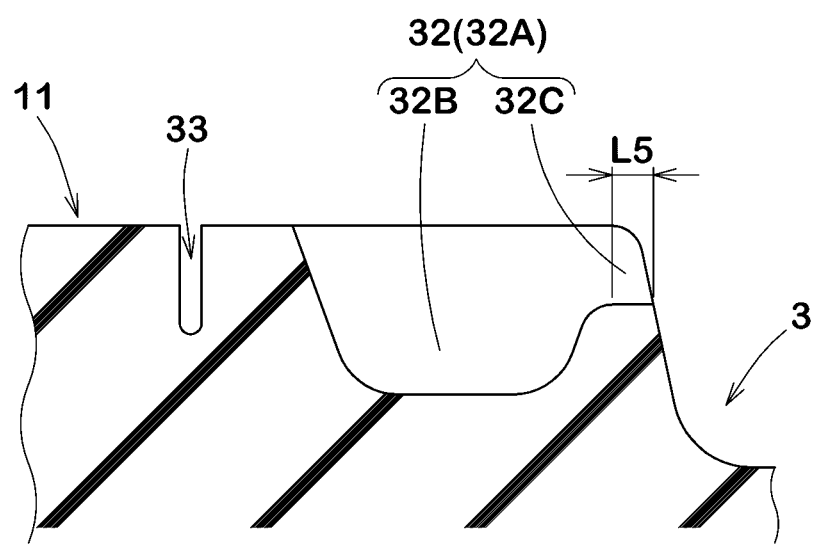
FIG. 4 is a cross-sectional view taken along A-A line of FIG. 3.

FIG. 4 is a cross-sectional view of one of the second middle sipes 32 (32A) taken along A-A line of FIG. 3. Each of the second middle sipes 32 has a deep bottom portion 32B and a shallow bottom portion 32C. By the deep bottom portion 32B and the shallow bottom portion 32C, each of the second middle sipes is formed step-wise. The shallow bottom portion 32C is positioned on an inner side in the tyre axial direction of the deep bottom portion 32B. Thereby, the rigidity in the tyre circumferential direction of the outer middle land region 11 in the vicinity of the crown main groove 3 is increased, therefore, the steering stability performance is improved.

The shallow bottom portion 32C extends outwardly in the tyre axial direction from the crown main groove 3 at a constant depth. It is preferred that the depth of the shallow bottom portion 32C is in a range of from 30% to 60% of a maximum depth of the deep bottom portion 32B. By the second middle sipes 32 configured as such, the rigidity distribution of the outer middle land region 11 is optimized, therefore, the ride comfort performance and the steering stability performance are improved in a good balance. It is preferred that a length L5 in the tyre axial direction of the shallow bottom portion 32C is in a range of from 1.5 to 3.0 mm. By the shallow bottom portion 32c configured as such, the rigidity distribution of the outer middle land region 11 is optimized, therefore, the ride comfort performance and the steering stability performance are improved in a good balance.

As shown in FIG. 3, the inner middle land region 12 is provided with third middle sipes 41 each extending inwardly in the tyre axial direction from the inner shoulder main groove 6 and fourth middle sipes 42 each extending outwardly in the tyre axial direction from the crown main groove 3. Thereby, impact which the inner middle land region 12 receives from a road surface is moderated by the third middle sipes 41 and the fourth middle sipes 42, therefore, the noise performance and the ride comfort performance of the tyre are improved.

Each of the third middle sipes 41 and the fourth middle sipes 42 in this embodiment is inclined in the same direction with respect to the tyre axial direction and extends in a curved manner with substantially the same curvature as the first middle sipes 31.

Each of the third middle sipes 41 has an inner end (41i) in the inner middle land region 12 and each of the fourth middle sipes 42 has an outer end (42o) in the inner middle land region 12. Thereby, the continuity in the tyre circumferential direction of the inner middle land region 12 is maintained, therefore, excellent steering stability performance is obtained by high rigidity thereof.

It is preferred that the number of the fourth middle sipes 42 is larger than the number of the second middle sipes 32. That is, it is preferred that each of pitches of the fourth middle sipes 42 is smaller than each of pitches of the second middle sipes 32. Further, it is preferred that the number of the fourth middle sipes 42 is equal to the number of the third middle sipes 41. More specifically, it is preferred that each of the pitches of the fourth middle sipes 42 is equal to each of the pitches of the third middle sipes 41. By the fourth middle sipes 42 and the third middle sipes 41 configured as such, the rigidity in the tyre circumferential direction of the outer middle land region 11 can be easily increased so as to be larger than the rigidity in the tyre circumferential direction of the inner middle land region 12. Thereby, high rigidity is easily ensured in the outer middle land region 11 in which the ground contact pressure during cornering tends to be high when the tyre has a slip angle or when the vehicle rolls, therefore, excellent steering stability performance is obtained. Further, sufficient ride comfort performance is secured by the inner middle land region 12.

Note that the rigidity in the tyre circumferential direction of each of the outer middle land region 11 and the inner middle land region 12 is easily estimated by the configuration of the sipes and the like provided in each of the land regions, however, to be more accurately, it is possible that the rigidity is also calculated by computer simulation and the like such as FEM (finite element method) and the like, for example.

The inner middle land region 12 may be provided with a second circumferential sipe 43 extending continuously in the tyre circumferential direction. The second circumferential sipe 43 extends between the inner ends (41i) of the third middle sipes 41 and the outer ends (42o) of the fourth middle sipes 42. The second circumferential sipe 43 in this embodiment extends linearly, but it may be configured to extend in a zigzag manner. It is preferred that the second circumferential sipe 43 is arranged at a position in a range of from 45% to 55% of a length in the tyre axial direction of the inner middle land region 12 from an inner end in the tyre axial direction of the inner middle land region 12. By the second circumferential sipe 43 configured as such, the impact which the inner middle land region 12 receives from a road surface is moderated, therefore, the noise performance and the ride comfort performance of the tyre are improved.

Similar to the first circumferential sipe 33, it is preferred that a width of the second circumferential sipe 43 is in a range of from 0.5 to 1.0 mm.

Figure 5:
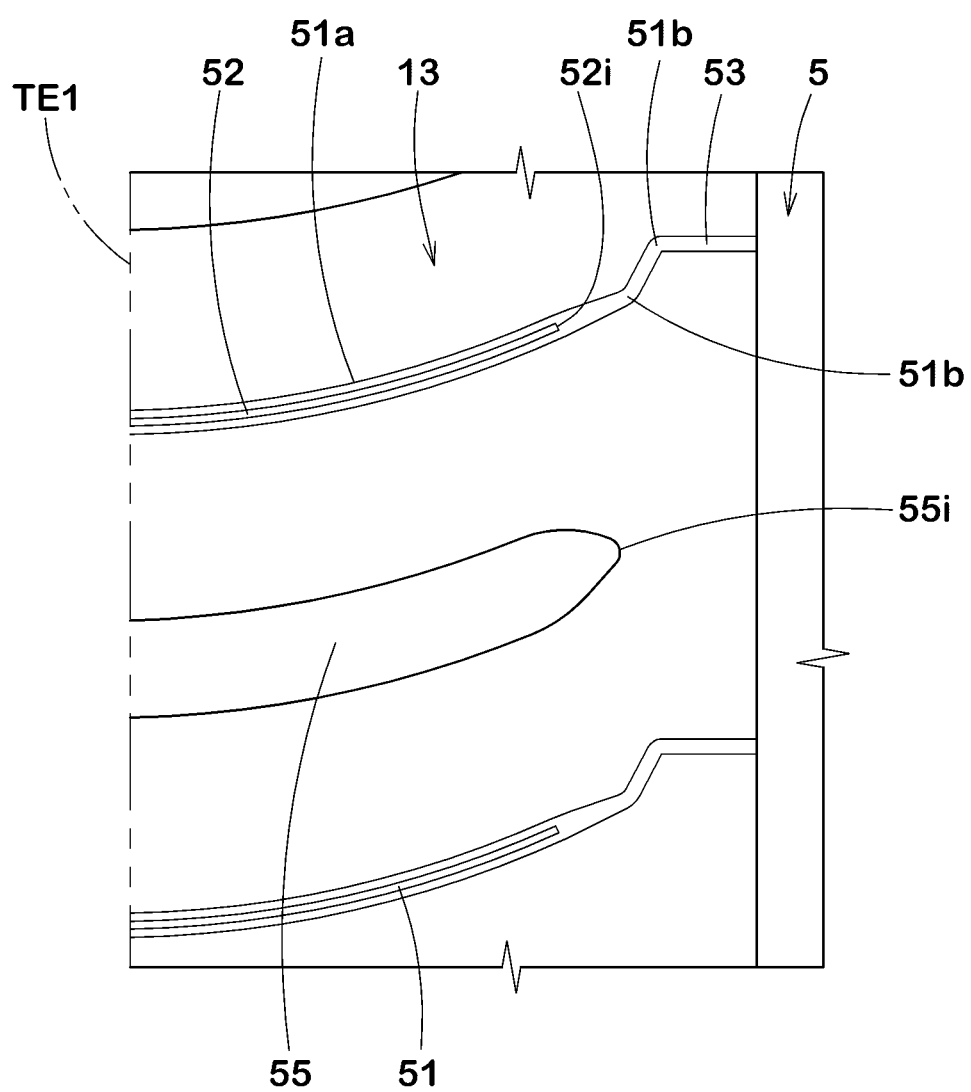
FIG. 5 is an enlarged development view of an outer shoulder land region of FIG. 1.

FIG. 5 shows the outer shoulder land region 13. The outer shoulder land region 13 is provided with a plurality of first shoulder sipes 51 each extending so as to connect between the outer tread ground contact edge TE1 and the outer shoulder main groove 5. The number of the first shoulder sipes 51 is equal to the number of the first middle sipes 31. By the first shoulder sipes 51 configured as such, impact which the outer shoulder land region 13 receives from a road surface is moderated, therefore, the noise performance and the ride comfort performance of the tyre are improved.

Each of the first shoulder sipes 51 includes a deep sipe 52 and a shallow sipe 53 having a depth smaller than that of the deep sipe 52. The deep sipe 52 extends inwardly in the tyre axial direction from the outer tread ground contact edge TE1 to have an inner end (52i) in the outer shoulder land region 13. The shallow sipe 53 connects between the inner end (52i) of the deep sipe 52 and the outer shoulder main groove 5. By the deep sipe 52 and the shallow sipe 53 configured as such, the rigidity in the tyre circumferential direction of an axially inner part of the outer shoulder land region 13 is easily secured, therefore, excellent steering stability performance is obtained.

A width of the shallow sipe 53 in this embodiment is larger than a width of the deep sipe 52. The shallow sipe 53 includes an outer region in a tyre radial direction of the deep sipe 52 and extends along the deep sipe 52 to the outer tread ground contact edge TE1. Thereby, the impact which the outer shoulder land region 13 receives from a road surface is further moderated, therefore, the noise performance and the ride comfort performance of the tyre are improved.

The deep sipe 52 in this embodiment is inclined in a direction opposite to the first middle sipes 31 with respect to tyre axial direction and extends in a curved manner.

The deep sipe 52 and the shallow sipe 53 have a curved portion (51a) extending in the tyre axial direction in a curved manner at a large radius. A radius of curvature of the curved portion (51a) is 75 mm or more, for example. By the curved portion (51a), components in the tyre axial direction and components in the tyre circumferential direction of the deep sipe 52 and the shallow sipe 53 vary mildly, therefore, the steering stability performance which is excellent in a transient characteristic during cornering is obtained.

The shallow sipe 53 has a bent portion (51b) extending in the tyre axial direction while bending at a small radius. A radius of curvature of the bent portion (51b) is 1 mm or less, for example. By the bent portion (51b), it is possible that the rigidity in the tyre circumferential direction and in the tyre axial direction of an axially inner part of the outer shoulder land region 13 is easily adjusted.

The outer shoulder land region 13 is provided with outer shoulder lateral grooves (first shoulder lateral grooves) 55 each extending inwardly in the tyre axial direction from the outer tread ground contact edge TE1. Each of the outer shoulder lateral grooves 55 has an inner end (55i) in the outer shoulder land region 13. Each of the outer shoulder lateral grooves 55 is arranged between a respective pair of the first shoulder sipes 51 adjacent to each other in the tyre circumferential direction. The outer shoulder lateral grooves 55 extend along the first shoulder sipes 51. By the outer shoulder lateral grooves 55, the impact which the outer shoulder land region 13 receives from a road surface, therefore, the ride comfort performance of the tyre is improved.

As shown in FIG. 1, it is preferred that a length L1 in the tyre axial direction of each of the outer shoulder lateral grooves 55 is larger than a length L2 in the tyre axial direction of each of the deep sipes 52. By the outer shoulder lateral grooves 55 configured as such, the impact which the outer shoulder land region 13 receives from a road surface is further moderated, therefore, the ride comfort performance of the tyre is improved.

Each of the outer shoulder lateral grooves 55 is arranged at a position so as not to overlap with any one of the first middle sipes 31 in the tyre circumferential direction. That is, when seen in the tyre axial direction, an overlapping length in the tyre circumferential direction between the outer shoulder lateral grooves 55 and the first middle sipes 31 is zero. By such a positional relation between the outer shoulder lateral grooves 55 and the first middle sipes 31, the rigidity distribution is made uniform throughout between the outer middle land region 11 and the outer shoulder land region 13, which contributes to the improvement of the ride comfort and the steering stability performance.

It is preferred that a length L3 in the tyre axial direction between the inner end (55i) of each of the outer shoulder lateral grooves 55 and the outer shoulder main groove 5 is in a range of from 10% to 30% of a length L4 in the tyre axial direction of the outer shoulder land region 13. The length L3 is 10% or more of the length L4, therefore, the impact which the outer shoulder land region 13 receives from a road surface is further moderated, thereby, the ride comfort performance of the tyre is improved. The length L3 is 30% or less of the length L4, therefore, the steering stability performance of the tyre is improved.

Figure 6:
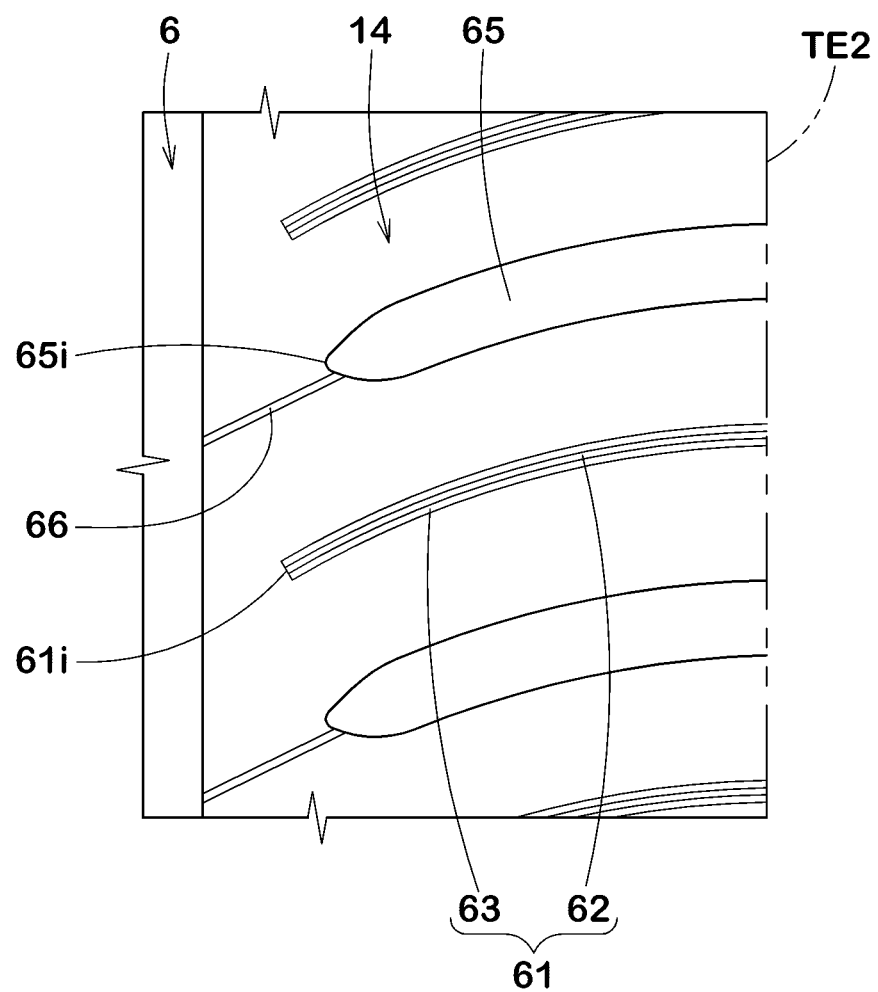
FIG. 6 is an enlarged development view of an inner shoulder land region of FIG. 1.

FIG. 6 shows the inner shoulder land region 14. The inner shoulder land region 14 is provided with a plurality of second shoulder sipes 61 each extending inwardly in the tyre axial direction from the inner tread ground contact edge TE2. Each of the second shoulder sipes 61 has an inner end (61i) in the inner shoulder land region 14. The number of the second shoulder sipes 61 is equal to the number of the first shoulder sipes 51. By the second shoulder sipes 61 configured as such, impact which the inner shoulder land region 14 receives from a road surface is moderated, therefore, the noise performance and the ride comfort performance of the tyre are improved.

Each of the second shoulder sipes 61 in this embodiment is inclined in a direction opposite to the first middle sipes 31 with respect to the tyre axial direction and extends in a curved manner.

Each of the second shoulder sipes 61 includes a deep sipe 62 and a shallow sipe 63 having a depth smaller than that of the deep sipe 62. The deep sipe 62 extends inwardly in the tyre axial direction from the inner tread ground contact edge TE2 to reach the inner end (61i). A width of the shallow sipe 63 is larger than a width of the deep sipe 62. The shallow sipe 63 includes an outer region in the tyre radial direction of the deep sipe 62 and extends inwardly in the tyre axial direction along the deep sipe 62 from the inner tread ground contact edge TE2 to reach the inner end (61i).

The inner shoulder land region 14 is provided with inner shoulder lateral grooves (second shoulder lateral grooves) 65 each extending inwardly in the tyre axial direction from the inner tread ground contact edge TE2. Each of the inner shoulder lateral grooves 65 has an inner end (65i) in the inner shoulder land region 14. Each of the inner shoulder lateral grooves 65 is arranged between a respective pair of the second shoulder sipes 61 adjacent to each other in the tyre circumferential direction. The inner shoulder lateral grooves 65 extend along the second shoulder sipes 61. By the inner shoulder lateral grooves 65, the impact which the inner shoulder land region 14 receives from a road surface is moderated, therefore, the ride comfort performance of the tyre is improved.

The inner shoulder land region 14 is provided with third shoulder sipes 66 each extending outwardly in the tyre axial direction from the inner shoulder main groove 6. Each of the third shoulder sipes 66 is connected with a respective one of the inner shoulder lateral grooves 65 at an inner end (65i) of the inner shoulder lateral groove 65 or in the vicinity thereof. By the third shoulder sipes 66, the impact which the inner shoulder land region 14 receives from a road surface is further moderated.

Figure 7:
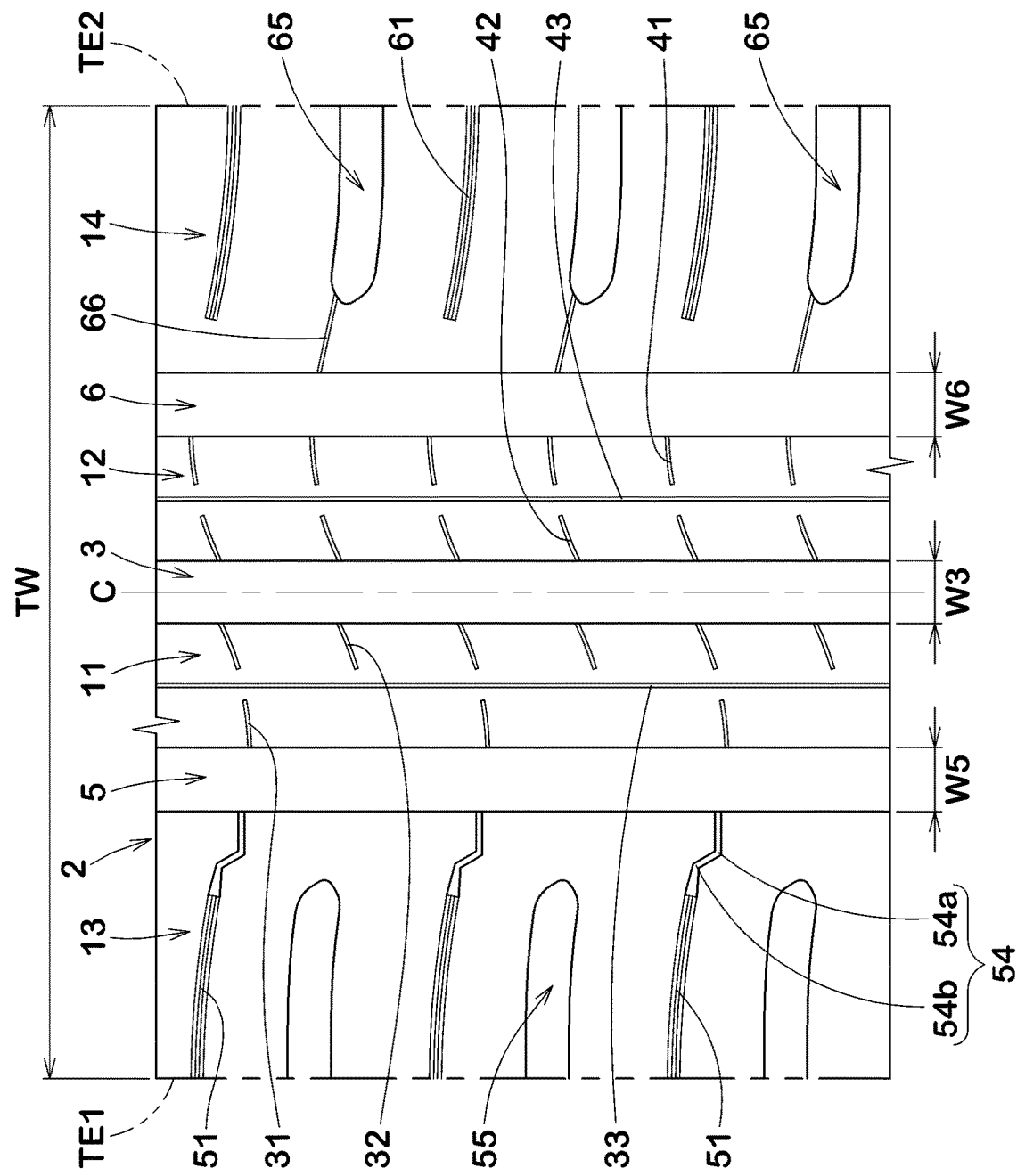
FIG. 7 is a development view of a tread portion of a tyre according to another embodiment of the present invention.
Figure 8:
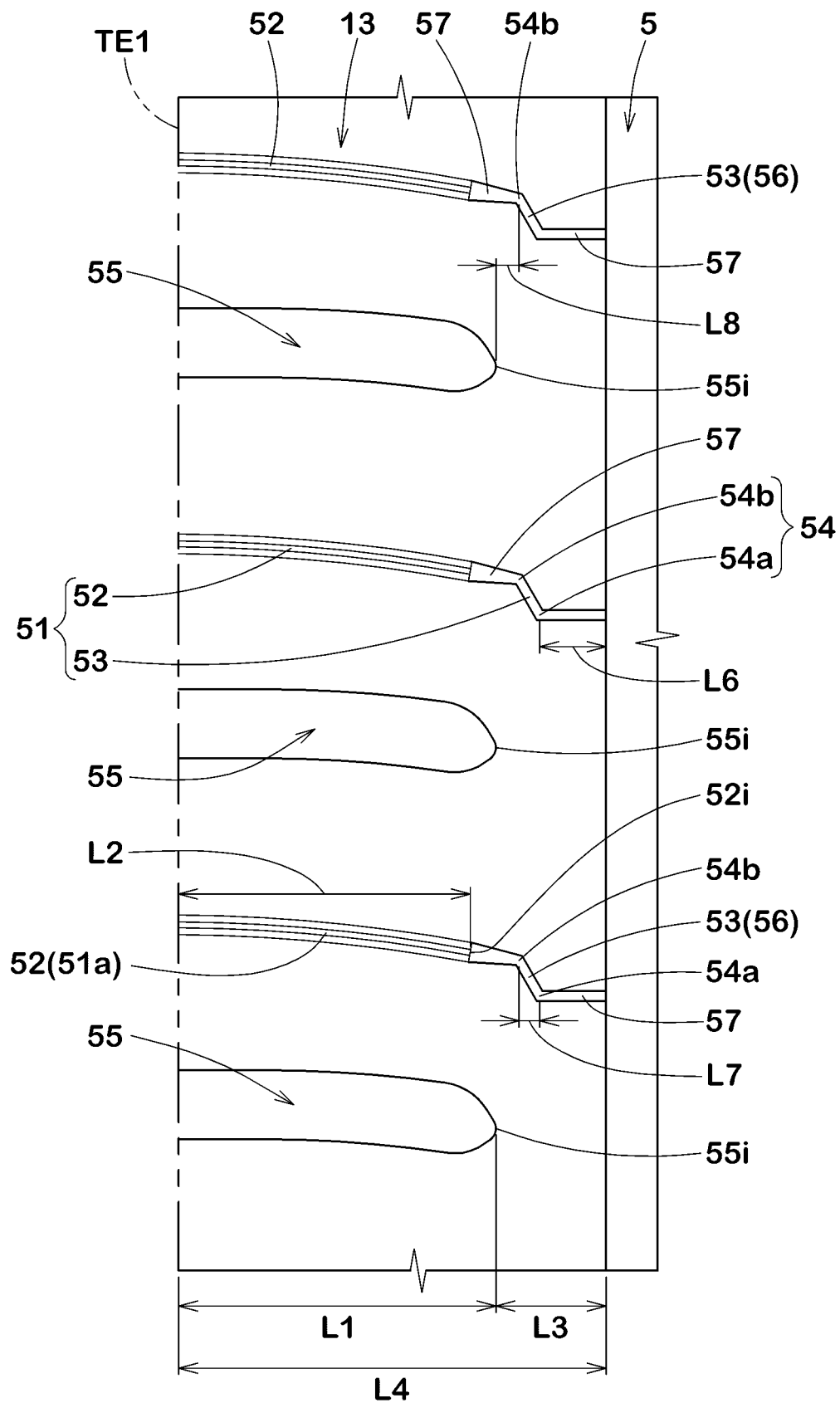
FIG. 8 is an enlarged view of an outer shoulder land region of FIG. 7.

FIG. 7 is a development view of the tread portion 2 according to another embodiment of the present invention. FIG. 8 is an enlarged view of the outer shoulder land region 13 in this embodiment. Note that the same reference numerals are given to the elements common to the embodiment described above, and the explanation thereof is omitted here.

As shown in FIG. 8, at least one of the first shoulder sipes 51 in this embodiment has a bent portion 54 extending in the tyre axial direction in a bent manner with a small radius. A radius of curvature of the bent portion 54 is 1 mm or less, for example.

The bent portion 54 includes a first bent portion (54a) bent so as to be convex in a first direction and a second bent portion (54b) bent so as to be convex in a direction opposite to the first direction. The second bent portion (54b) in this embodiment is arranged on an outer side in the tyre axial direction of the first bent portion (54a).

The first shoulder sipes 51 exert frictional force in multiple directions by edges of the first bent portion (54a) and the second bent portion (54b), therefore, it is possible that on-ice/on-snow performance is improved. Further, opposing sipe walls of each of the first bent portion (54a) and the second bent portion (54b) come into close contact with each other when the ground contact pressure is applied to the ground contacting surface of the outer shoulder land region 13. Thereby, it is possible that shearing deformation of the outer shoulder land region 13 with the first shoulder sipes 51 as borders is suppressed, therefore, steering stability is improved.

It is preferred that the first bent portion (54a) and the second bent portion (54b) are arranged on the inner side in the tyre axial direction of a center in the tyre axial direction of the outer shoulder land region 13. Thereby, the first bent portion (54a) and the second bent portion (54b) are likely to receive large ground contact pressure, therefore, the on-ice/on-snow performance is further improved.

It is preferred that a distance L6 in the tyre axial direction between a closer one of groove edges of the outer shoulder main groove 5 and the first bent portion (54a) is in a range of from 0.10 to 0.25 times the length L4 in the tyre axial direction of the outer shoulder land region 13. Further, it is preferred that a distance L7 in the tyre axial direction between the first bent portion (54a) and the second bent portion (54b) is smaller than the groove width w5 of the outer shoulder main groove 5. Specifically, it is preferred that the distance L7 is in a range of from 0.15 to 0.30 times the groove width w5 of outer shoulder main groove 5. Thereby, when the sipe walls come into close contact with each other, the rigidity of the outer shoulder land region 13 is effectively improved.

Each of the first shoulder sipes 51 has a vertical component 56 between the first bent portion (54a) and the second bent portion (54b). It is preferred that the vertical component 56 is arranged at an angle of less than 30 degrees with respect to the tyre circumferential direction, for example. Further, it is preferred that a length of the vertical component 56 is in a range of from 3.0 to 7.0 mm, for example. The vertical component 56 configured as such provide frictional force in the tyre axial direction, therefore, it is possible that skidding on an icy/snowy road surface is suppressed.

The first bent portion (54a) and the second bent portion (54b) in this embodiment is connected with a lateral component 57 extending at an angle of less than 10 degrees with respect to the tyre axial direction, for example. The lateral component 57 configured as such is useful for increasing traction on an icy/snowy road surface.

In this embodiment, the first bent portion (54a) and the second bent portion (54b) described above are formed in at least one of the shallow sipes 53.

It is preferred that a width of each of the shallow sipes 53 is in a range of from 0.5 to 1.0 mm, for example. It is preferred that a depth of each of the shallow sipes 53 is in a range of from 0.5 to 3.0 mm, for example.

Each of the deep sipes 52 in this embodiment is inclined at an angle in a range of from 5 to 20 degrees with respect to the tyre axial direction and extends in a curved manner, for example.

It is preferred that each of the plurality of the outer shoulder lateral grooves 55 in this embodiment is arranged at an angle in a range of from 0 to 10 degrees with respect to the tyre axial direction, for example.

It is preferred that the length L1 in the tyre axial direction of each of the outer shoulder lateral grooves 55 is larger than the length L2 in the tyre axial direction of each of the deep sipes 52. By the outer shoulder lateral grooves 55 configured as such, the impact which the outer shoulder land region 13 receives from a road surface is further moderated, therefore, the ride comfort performance of the tyre is improved.

A distance L8 in the tyre axial direction between the inner end (55i) of each of the outer shoulder lateral grooves 55 and its adjacent one of the second bent portions (54b) is preferably smaller than the groove width w5 of the outer shoulder main groove 5, and more preferably smaller than 0.50 times the groove width w5. Specifically, the distance L8 is in a range of from 0.25 to 0.35 times the groove width w5. Thereby, sipe walls of the first bent portions (54a) and the second bent portions (54b) come into close contact with each other, therefore, deformation of the rubber in the vicinity of the inner ends (55i) of the outer shoulder lateral grooves 55 is suppressed, thereby, uneven wear in the vicinity of the inner ends (55i) is suppressed.

Figure 9:
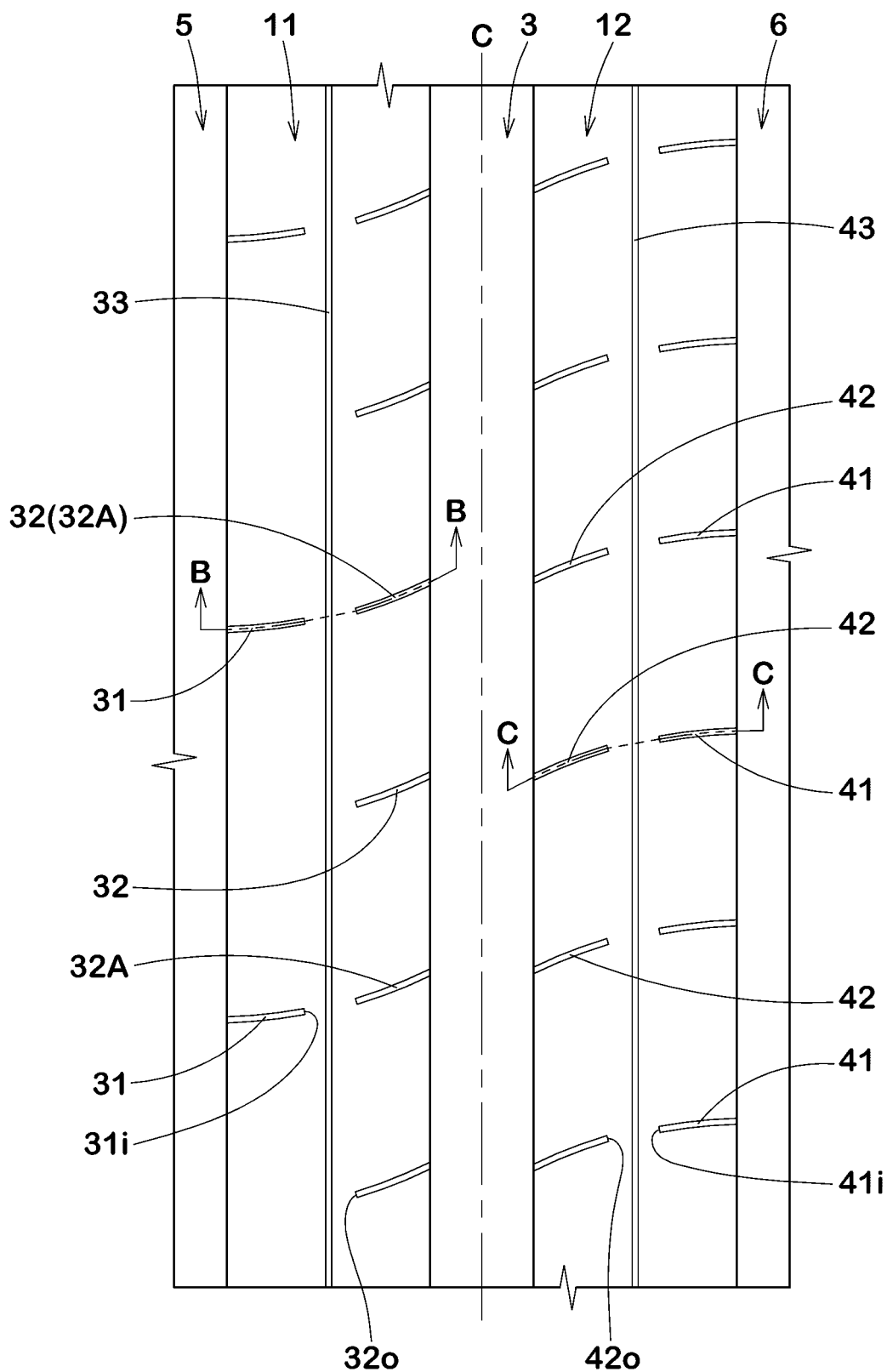
FIG. 9 is an enlarged view of an outer middle land region and an inner middle land region of FIG. 7.

FIG. 9 shows the outer middle land region 11 and the inner middle land region 12 of the embodiment shown in FIG. 7. The second middle sipes 32 in this embodiment are inclined in the same direction as the first middle sipes 31. In a preferred embodiment, each of the second middle sipes 32 is inclined at a larger angle with respect to the tyre axial direction than the first middle sipes 31.

As shown in FIG. 7, it is preferred that each of the first middle sipes 31 is arranged at a position so as to be continuous with a respective one of the first shoulder sipes 51 with the outer shoulder main groove 5 therebetween. Note that this embodiment includes an embodiment in which a minimum displacement amount in the tyre circumferential direction in the outer shoulder main groove 5 between a region obtained by virtually extending one of the sipes and a region obtained by virtually extending the other one of the sipes is 2.0 mm or less. The first middle sipes 31 configured as such are easily opened moderately together with the first shoulder sipes 51, therefore, it is possible that the traction on an icy/snowy road surface is further improved.

Figure 10:
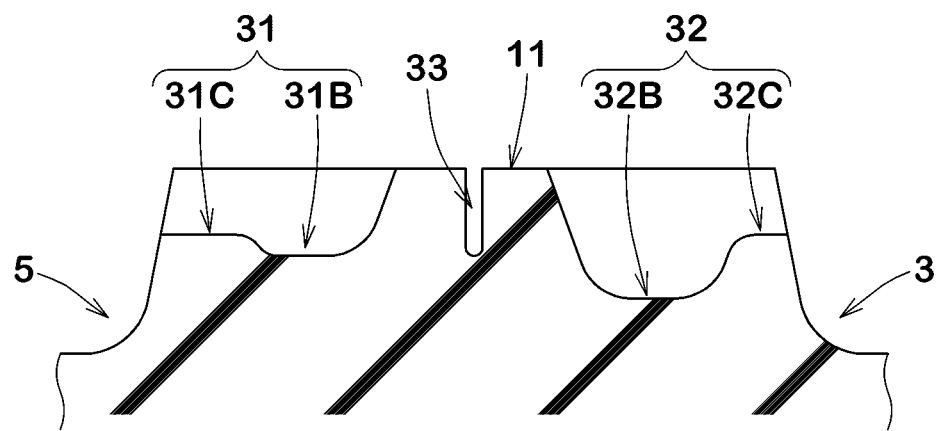
FIG. 10 is a cross-sectional view taken along B-B line of FIG. 9.

FIG. 10 is a cross-sectional view of one of the first middle sipes 31 and one of the second middle sipes 32 taken along B-B line of FIG. 9. Each of the first middle sipes 31 has a deep bottom portion 31B and a shallow bottom portion 31C. By the deep bottom portion 31B and the shallow bottom portion 31C, each of the first middle sipes 31 is formed step-wise. In each of the first middle sipes 31, the shallow bottom portion 31C is arranged on the outer side in the tyre axial direction of the deep bottom portion 31B.

Each of the second middle sipes 32 has the deep bottom portion 32B and the shallow bottom portion 32C. By the deep bottom portion 32B and the shallow bottom portion 32C, each of the second middle sipes 32 is formed step-wise. In each of the second middle sipes 32, the shallow bottom portion 32C is arranged on the inner side in the tyre axial direction of the deep bottom portion 32B. Thereby, the rigidity in the tyre circumferential direction of the outer middle land region 11 in the vicinity of the crown main groove 3 is increased, therefore, the steering stability performance is improved.

It is preferred that a maximum depth of each of the second middle sipes 32 is larger than a maximum depth of each of the first middle sipes 31. It is possible that the second middle sipes 32 configured as such provide large frictional force on an icy/snowy road surface.

The shallow bottom portion 32C extends outwardly in the tyre axial direction from the crown main groove 3 at a constant depth. It is preferred that the depth of the shallow bottom portion 32C is in a range of from 30% to 60% of a maximum depth of the deep bottom portion 32B. By the second middle sipes 32 configured as such, the rigidity distribution of the outer middle land region 11 is optimized, therefore, the ride comfort performance and the steering stability performance are improved in a good balance.

As shown in FIG. 9, in this embodiment, it is preferred that a total number of the fourth middle sipes 42 provided in the inner middle land region 12 is equal to a total number of the third middle sipes 41 provided in the inner middle land region 12. More specifically, it is preferred that each of pitches of the fourth middle sipes 42 is equal to each of pitches of the third middle sipes 41. Further, in this embodiment, the total number of the fourth middle sipes 42 provided in the inner middle land region 12 is equal to a total number of the second middle sipes 32 provided in the outer middle land region 11. Thereby, the steering stability and the on-ice/on-snow performance are improved in a good balance.

Figure 11:
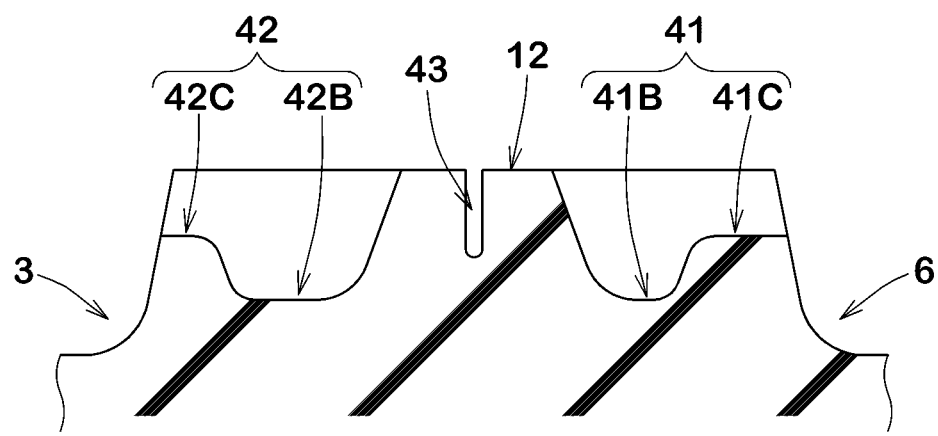
FIG. 11 is a cross-sectional view taken along C-C line of FIG. 9.

FIG. 11 is a cross-sectional view of one of the third middle sipes 41 and one of the fourth middle sipes 42 taken along c-c line of FIG. 9. Each of the third middle sipes 41 has a deep bottom portion 41B and a shallow bottom portion 41C. Each of the fourth middle sipes 42 has a deep bottom portion 42B and a shallow bottom portion 42C. The above-described configurations of the deep bottom portion 32B and the shallow bottom portion 32C of each of the second middle sipes 32 can be applied to the deep bottom portion 42B and the shallow bottom portion 42C of each of the fourth middle sipes 42.

It is preferred that a maximum depth of each of the third middle sipes 41 and a maximum depth of each of the fourth middle sipes 42 are larger than the maximum depth of each of the first middle sipes 31, for example. It is preferred that a maximum depth of each of the third middle sipes 41 and a maximum depth of each of the fourth middle sipes 42 are larger than the maximum depth of each of the first middle sipes 31, for example. Thereby, it is possible that excellent steering stability is exerted.

Figure 12:
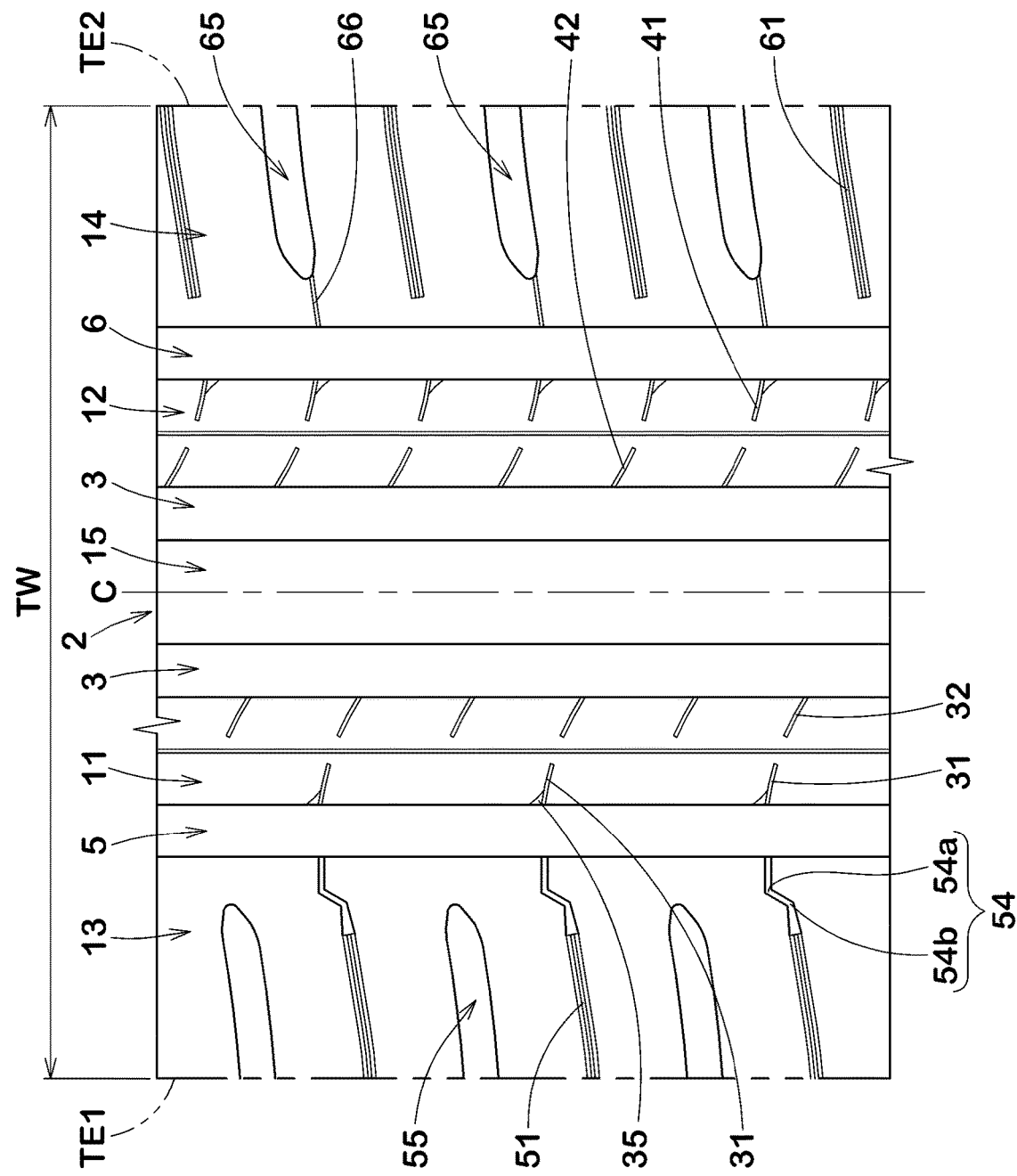
FIG. 12 is a development view of a tread portion of a tyre according to yet another embodiment of the present invention.

FIG. 12 is a development view of the tread portion 2 according to yet another embodiment of the present invention. In FIG. 12, the same reference numerals are given to the elements common to the embodiments described above, and the explanation thereof is omitted here.

In the embodiment shown in FIG. 12, the tread portion includes two crown main grooves 3 arranged so as to sandwich the tyre equator (C) and a crown land region 15 defined between them and arranged on the tyre equator (C).

It is preferred that the crown land region 15 is a plain rib having no grooves or sipes arranged therein, for example. The crown land region 15 configured as such effectively improves the steering stability on a dry road surface.

In this embodiment, the chamfered portion 35 is formed at a connection portion between each of the first middle sipes 31 and the outer shoulder main groove 5. The chamfered portion 35 includes an inclined surface surrounded by one of edges of the outer middle land region 11 on the ground contacting surface, an edge of the outer shoulder main groove 5 on one of groove walls thereof, and an edge of a respective one of the first middle sipes 31 on one of sipe walls thereof. The chamfered portions 35 configured as such moderate the impact which the outer middle land region 11 receives from a road surface, therefore, they are helpful for improving the noise performance and the ride comfort performance.

While detailed description has been made of the tyre of the present invention, the present invention can be embodied in various forms without being limited to the illustrated embodiments.

Working Example (Example)

Pneumatic tyres of size 205/60R17 having the basic tread pattern shown in FIG. 1 were made by way of test according to the specifications listed in Table 1, and then the test tyres were tested for the drainage performance, the noise performance, and the steering stability performance.

The common specifications were as follows.

Thickness of tread rubber of crown portion: 10.0 mm
Belt cord: 1×2/0.295/46e
Belt angle: 26 degrees
Band cord: 940 dtex/2/48e
Band angle: 0 degrees
The test methods were as follows.
<Steering Stability Performance>

Each of the test tyres was mounted on a rim of 17×6.03 and mounted on all wheels of a test vehicle (FF passenger car with displacement of 1500 cc) under the condition of the tyre inner pressure of 240 kPa. While the test vehicle described above was driven on a dry asphalt road surface of a test course with the driver being the only member on the test vehicle, characteristics relating to grip performance, steering response, and responsiveness were evaluated by the driver's feeling. The test results are indicated by an evaluation point based on Example 1 being 100, wherein the larger the numerical value, the better the steering stability performance is.

<Noise Performance>

While the test vehicle was driven on a road noise measuring road (a road having a rough asphalt surface) at a speed of 60 km/h, the in-car noise was sampled at a position in the vicinity of the driver's window-side ear, and the sound pressure level was measured. The test results are indicated by an index based on the value of the Example 1 being 100, wherein a larger numerical value is better.

<Ride Comfort Performance>

While the test vehicle was driven on a dry road surface of a test course, the ride comfort performance based on rigid impression at that time was evaluated by the driver's feeling. The test results are indicated by an evaluation point based on the Example 1 being 100, wherein the larger the numerical value, the better the ride comfort performance is.

TABLE 1

|  | Ref. 1 | Ref. 2 | Ex. 1 | Ex. 2 | Ex. 3 | Ex. 4 |
|---|---|---|---|---|---|---|
| Number of second middle sipes/Number of First middle sipes | 0.5 | 1 | 2 | 3 | 2 | 2 |
| Number of Fourth middle sipes/Number of Third middle sipes | 1 | 1 | 1 | 1 | 2 | 1 |
| Length L3/Length L4 [%] | 20 | 20 | 20 | 20 | 20 | 5 |
| Length L5 [mm] | 2 | 2 | 2 | 2 | 2 | 2 |
| Presence or Absence of First and Second Circumferential sipes | Absence | Absence | Absence | Absence | Absence | Absence |
| Width of First and Second Circumferential sipes [mm] | 0 | 0 | 0 | 0 | 0 | 0 |
| Steering stability performance [evaluation point] | 70 | 70 | 100 | 95 | 105 | 90 |
| Noise performance [index] | 100 | 105 | 100 | 105 | 95 | 95 |
| Ride comfort performance [evaluation point] | 100 | 105 | 100 | 105 | 95 | 110 |

|  | Ex. 5 | Ex. 6 | Ex. 7 | Ex. 8 | Ex. 9 | Ex. 10 |
|---|---|---|---|---|---|---|
| Number of Second middle sipes/Number of First middle sipes | 2 | 2 | 2 | 2 | 2 | 2 |
| Number of Fourth middle sipes/Number of Third middle sipes | 1 | 1 | 1 | 1 | 1 | 1 |
| Length L3/Length L4 [%] | 10 | 30 | 40 | 20 | 20 | 20 |
| Length L5 [mm] | 2 | 2 | 2 | 0.8 | 1.5 | 3 |
| Presence or Absence of First and Second Circumferential sipes | Absence | Absence | Absence | Absence | Absence | Absence |
| Width of First and Second Circumferential sipes [mm] | 0 | 0 | 0 | 0 | 0 | 0 |
| Steering stability performance [evaluation point] | 100 | 105 | 110 | 110 | 100 | 100 |
| Noise performance [index] | 95 | 100 | 100 | 95 | 100 | 100 |
| Ride comfort performance [evaluation point] | 105 | 95 | 85 | 90 | 100 | 100 |

|  | Ex. 11 | Ex. 12 | Ex. 13 | Ex. 14 | Ex. 15 |
|---|---|---|---|---|---|
| Number of Second middle sipes/Number of First middle sipes | 2 | 2 | 2 | 2 | 2 |
| Number of Fourth middle sipes/Number of Third middle sipes | 1 | 1 | 1 | 1 | 1 |
| Length L3/Length L4 [%] | 20 | 20 | 20 | 20 | 20 |
| Length L5 [mm] | 4 | 2 | 2 | 2 | 2 |
| Presence or Absence of First and Second Circumferential sipes | Absence | Presence | Presence | Presence | Presence |
| Width of First and Second Circumferential sipes [mm] | 0 | 0.5 | 1 | 1.5 | 2 |
| Steering stability performance [evaluation point] | 90 | 100 | 95 | 95 | 90 |
| Noise performance [index] | 100 | 100 | 100 | 100 | 100 |
| Ride comfort performance [evaluation point] | 105 | 105 | 115 | 115 | 115 |

As is clear from Table 1, it was confirmed that the steering stability performance, the ride comfort performance, and the noise performance were significantly improved in a good balance in the tyres as the Examples as compared with the tyres as References without changing thickness of the tread rubber and the like.

Figure 13:
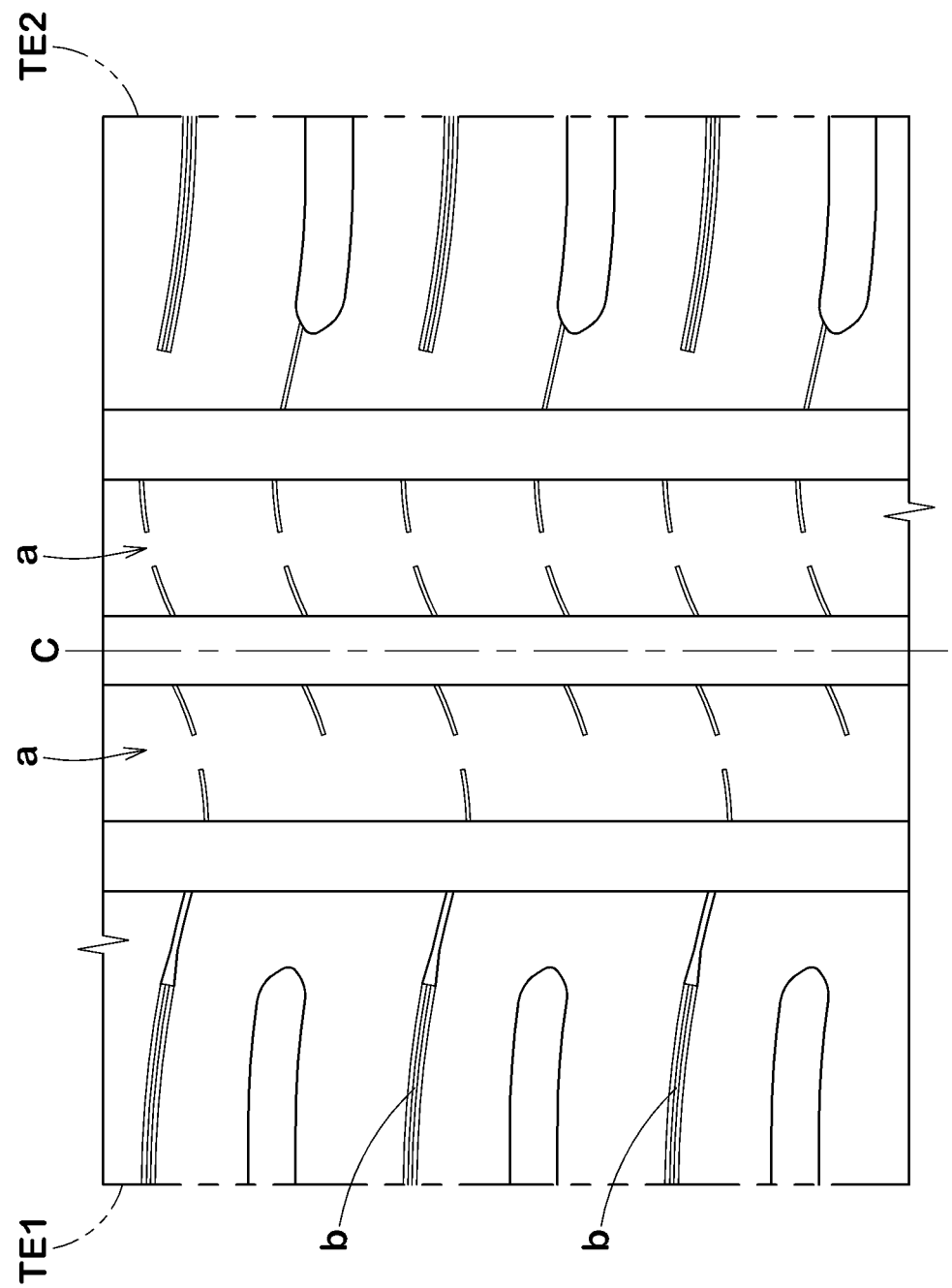
FIG. 13 is a development view of a tread portion of a tyre as Reference 3.

Tyres of size 215/60R16 having the basic pattern shown in FIG. 7 were made by way of test according to the specifications listed in Table 1. As Reference 3, as shown in FIG. 13, tyres were made by way of test in which no circumferential sipes were arranged in each of middle land regions (a) and none of first shoulder sipes (b) had the bent portion. The tyres as the Reference 3 had substantially the same tread pattern as that shown in FIG. 7 except for the configuration described above. Each of the test tyres was tested for the steering stability and the on-ice/on-snow performance. Common specifications of the test tyres and the test methods were as follows.

Tyre rim: 16×7.0 J
Tyre inner pressure: 210 kPa at front wheels, 200 kPa at rear wheels
Test vehicle: 4WD-car with displacement of 1500 cc
Tyre mounting position: all wheels
<Steering Stability>
While a test driver drove the test vehicle on a dry road surface, the steering stability was evaluated by the driver's feeling. The test results are indicated by an evaluation point based on the Reference 3 being 100, wherein the larger the numerical value, the better the steering stability is.
<On-Ice/On-Snow Performance>
While the above test vehicle was driven on an icy/snowy road surface having snow and ice mixture thereon, performance such as steering responsiveness, starting feeling, braking feeling, grip and the like were evaluated by the driver's feeling. The test results are indicated by an evaluation point based on the Reference 3 being 100, wherein the larger the numerical value, the better the on-ice/on-snow performance is.

Test results are shown in Table 2.

TABLE 2

|  | Ref. 3 | Ex. 16 | Ex. 17 | Ex. 18 | Ex. 19 | Ex. 20 | Ex. 21 | Ex. 22 | Ex. 23 | Ex. 24 |
| --- | --- | --- | --- | --- | --- | --- | --- | --- | --- | --- |
| Figure showing Tread pattern | FIG. 13 | FIG. 7 | FIG. 7 | FIG. 7 | FIG. 7 | FIG. 7 | FIG. 7 | FIG. 7 | FIG. 7 | FIG. 7 |
| Distance L6 between Outer shoulder main groove and First bent portion/Length L4 of outer shoulder land region | — | 0.15 | 0.10 | 0.20 | 0.25 | 0.30 | 0.15 | 0.15 | 0.15 | 0.15 |
| Length of Vertical component [mm] | — | 5.0 | 5.0 | 5.0 | 5.0 | 5.0 | 3.0 | 4.0 | 6.0 | 7.0 |
| Steering stability performance [evaluation point] | 100 | 105 | 103 | 105 | 105 | 105 | 104 | 105 | 105 | 104 |
| On-ice/on-snow performance [evaluation point] | 100 | 107 | 107 | 107 | 106 | 105 | 106 | 106 | 107 | 107 |

From the test results, it was confirmed that the tyres as the Examples exerted excellent steering stability and excellent on-ice/on-snow performance.

The invention claimed is:

1. A tyre comprising a tread portion comprising
a first shoulder main groove extending continuously in a tyre circumferential direction on a side of a first tread ground contact edge positioned on one side of a tyre equator,
a second shoulder main groove extending continuously in the tyre circumferential direction on a side of a second tread ground contact edge positioned on the other side of the tyre equator,
at least one crown main groove extending continuously in the tyre circumferential direction between the first shoulder main groove and the second shoulder main groove,
a first middle land region defined between the first shoulder main groove and the at least one crown main groove,
a second middle land region defined between the second shoulder main groove and the at least one crown main groove,
a first shoulder land region defined between the first tread ground contact edge and the first shoulder main groove, and
a second shoulder land region defined between the second tread ground contact edge and the second shoulder main groove, wherein
the first middle land region is provided with
first middle sipes each extending inwardly in a tyre axial direction from the first shoulder main groove to have an inner end in the first middle land region, and
second middle sipes each extending outwardly in the tyre axial direction from the at least one crown main groove to have an outer end in the first middle land region,
a number of the second middle sipes is larger than a number of the first middle sipes,
the first shoulder land region is provided with a plurality of first shoulder sipes each connecting between the first tread ground contact edge and the first shoulder main groove,
each of the first shoulder sipes includes a deep sipe extending inwardly in the tyre axial direction from the first tread ground contact edge to have an inner end in the first shoulder land region and a shallow sipe connecting between the inner end of the deep sipe and the first shoulder main groove and having a depth smaller than that of the deep sipe,
the first shoulder land region is provided with first shoulder lateral grooves each extending inwardly in the tyre axial direction from the first tread ground contact edge between a respective pair of the first shoulder sipes adjacent to each other in the tyre circumferential direction to have an inner end in the first shoulder land region, and
a length in the tyre axial direction of each of the first shoulder lateral grooves is larger than a length in the tyre axial direction of the deep sipe.

2. The tyre according to claim 1, wherein
the number of the second middle sipes is twice or more the number of the first middle sipes.

3. The tyre according to claim 1, wherein
the second middle land region is provided with third middle sipes each extending inwardly in the tyre axial direction from the second shoulder main groove to have an inner end in the second middle land region, and fourth middle sipes each extending outwardly in the tyre axial direction from the at least one crown main groove to have an outer end in the second middle land region, and a number of the fourth middle sipes is equal to a number of the third middle sipes.

4. The tyre according to claim 3, wherein
rigidity in the tyre circumferential direction of the first middle land region is greater than rigidity in the tyre circumferential direction of the second middle land region.

5. The tyre according to claim 1, wherein
the deep sipe has a curved portion extending in the tyre axial direction in a curved manner, and
the shallow sipe has a bent portion extending in the tyre axial direction in a bent manner.

6. The tyre according to claim 1, wherein
the first shoulder lateral grooves are provided at positions so as not to overlap with the first middle sipes in the tyre circumferential direction.

7. The tyre according to claim 1, wherein
a length in the tyre axial direction between the inner end of each of the first shoulder lateral grooves and the first shoulder main groove is in a range of from 10% to 30% of a length in the tyre axial direction of the first shoulder land region.

8. The tyre according to claim 1, wherein
a position of the tread portion when the tyre is mounted on a vehicle is specified such that the first tread ground contact edge is positioned on an outer side of the vehicle,
the first middle land region is provided with a first circumferential sipe extending continuously in the tyre circumferential direction,
the first shoulder land region is provided with a plurality of first shoulder sipes each extending between the first tread ground contact edge and the first shoulder main groove,
at least one of the first shoulder sipes has a bent portion, and
the bent portion includes a first bent portion which is bent so as to be convex in a first direction and a second bent portion which is bent so as to be convex in a direction opposite to the first direction.

9. The tyre according to claim 8, wherein
the at least one of the first shoulder sipes has a vertical component arranged between the first bent portion and the second bent portion, and
the vertical component is arranged at an angle of less than 30 degrees with respect to the tyre circumferential direction.

10. The tyre according to claim 8, wherein
the first bent portion and the second bent portion are arranged on an inner side in the tyre axial direction of a center in the tyre axial direction of the first shoulder land region.

11. The tyre according to claim 8, wherein
the first shoulder land region is provided with a plurality of first shoulder lateral grooves each extending from the first tread ground contact edge to terminate within the first shoulder land region.

12. The tyre according to claim 11, wherein
each of the plurality of the first shoulder lateral grooves is arranged at an angle in a range of from 0 to 10 degrees with respect to the tyre axial direction.

13. The tyre according to claim 11, wherein
the second bent portion is arranged on an outer side in the tyre axial direction of the first bent portion, and a distance in the tyre axial direction between the inner end in the tyre axial direction of each of the first shoulder lateral grooves and the second bent portion is smaller than a groove width of the first shoulder main groove.

14. The tyre according to claim 8, wherein
each of the first middle sipes is arranged at a position so as to be continuous with a respective one of the first shoulder sipes with the first shoulder main groove therebetween.

15. The tyre according to claim 8, wherein
a chamfered portion is formed at a connection portion between each of the first middle sipes and the first shoulder main groove.

16. The tyre according to claim 15, wherein
the chamfered portion includes an inclined surface surrounded by one of edges of the first middle land region on a ground contacting surface thereof, one of edges of the first shoulder main groove on groove walls thereof, and one of edges of a respective one of the first middle sipes on sipe walls thereof.

17. The tyre according to claim 8, wherein
the tread portion includes a crown land region arranged on the tyre equator, and
the crown land region is a plain rib provided with no grooves and no sipes.

18. A tyre comprising a tread portion comprising
a first shoulder main groove extending continuously in a tyre circumferential direction on a side of a first tread ground contact edge positioned on one side of a tyre equator,
a second shoulder main groove extending continuously in the tyre circumferential direction on a side of a second tread ground contact edge positioned on the other side of the tyre equator,
at least one crown main groove extending continuously in the tyre circumferential direction between the first shoulder main groove and the second shoulder main groove,
a first middle land region defined between the first shoulder main groove and the at least one crown main groove,
a second middle land region defined between the second shoulder main groove and the at least one crown main groove,
a first shoulder land region defined between the first tread ground contact edge and the first shoulder main groove, and
a second shoulder land region defined between the second tread ground contact edge and the second shoulder main groove, wherein
the first middle land region is provided with first middle sipes each extending inwardly in a tyre axial direction from the first shoulder main groove to have an inner end in the first middle land region, and second middle sipes each extending outwardly in the tyre axial direction from the at least one crown main groove to have an outer end in the first middle land region,
the second middle land region is provided with third middle sipes each extending inwardly in the tyre axial direction from the second shoulder main groove to have an inner end in the second middle land region, and fourth middle sipes each extending outwardly in the tyre axial direction from the at least one crown main groove to have an outer end in the second middle land region,
a number of the second middle sipes is larger than a number of the first middle sipes, a number of the fourth middle sipes is equal to a number of the third middle sipes, and the number of the third middle sipes and the number of the fourth middle sipes are each larger than the number of the second middle sipes.

\* \* \* \* \*